2,866,823

PROCESS FOR THE REMOVAL OF FORMALDEHYDE FROM CRUDE PYRUVIC ALDEHYDE SOLUTION

Howard R. Guest, Charleston, and Ben W. Kiff, Ona, W. Va., assignors to Union Carbide Corporation, a corporation of New York No Drawing. Application December 14, 1956
Serial No. 628,223

5 Claims. (Cl. 260—593)

This invention relates to a process for the removal of formaldehyde from aqueous solutions containing pyruvic aldehyde.

Pyruvic aldehyde is a useful intermediate in the production of many chemical compounds. It has been found to be valuable as an intermediate in the synthesis of particularly potent insecticides of the allethrin type. For example, in one of the steps in the synthesis of the alcohol portion of the allethrin molecule, pyruvic aldehyde is reacted with the beta-keto ester ethyl 3-keto-6-heptenoate to form 3-hydroxy-8-nonene-2,5-dione. Similarly, in the synthesis of the alcohol portion of the cyclethrin molecule, pyruvic aldehyde is reacted with the beta-keto ester ethyl-4-(2-cyclopentenyl)-3-ketobutyrate to form 6-(2-cyclopentenyl)-3-hydroxy-2,5-hexanedione. Aqueous pyruvic aldehyde solutions which are commercially available contain considerable amounts of formaldehyde. When these solutions are utilized as a source of pyruvic aldehyde in the reaction with beta-keto esters, the presence of formaldehyde in the solution of pyruvic aldehyde results in the formation of undesirable side products which greatly decrease the yield of the desired dione. This undesirable by-product formation in one step of either the cyclethrin or the allethrin synthesis results in a substantial overall decrease in efficiency and economy in the synthesis of these materials. Thus, there is a need in the art for a pyruvic aldehyde solution which is substantially free of formaldehyde.

Pyruvic aldehyde is a ketonic aldehyde which behaves in a markedly different manner from simple aldehydes. For example, it has the propensity for forming polymeric hydrates in aqueous solution. Although the structure of the compound in aqueous solutions is quite different from its familiar structural formula in the monomeric state, most of its chemical reactions proceed as if the monomer had been present. However, since the hydrates which it forms are present in a polymeric state and the degree of the polymerization is a function of the dilution in water, the application of the usual laws of physical chemistry is not possible for aqueous pyruvic aldehyde solutions. Formaldehyde also behaves in a peculiar manner in distillation systems and also forms polymeric hydrates of varying molecular weights. For these reasons, no effective system has yet been discovered for the removal of formaldehyde from aqueous pyruvic aldehyde solutions.

Formaldehyde can not be removed from crude pyruvic aldehyde solutions by a conventional fractional distillation. When an attempt is made to distill the crude pyruvic aldehyde solution, the distillate contains some formaldehyde but most of it remains in the residue. At the same time, some pyruvic aldehyde distills out with the formaldehyde. Furthermore, at the relatively high temperatures used during the atmospheric distillation of such a mixture, a considerable portion of the pyruvic aldehyde is converted to lactic acid, which in turn is converted to polymeric lactides.

In some cases it is possible to remove formaldehyde from aqueous solutions by counter-current stripping with steam. However, because of the peculiar volatility characteristics of pyruvic aldehyde, this method cannot successfully be used for the removal of formaldehyde from aqueous pyruvic aldehyde solutions.

Thus, prior to the present invention, there was no process known for the effective removal of formaldehyde from aqueous pyruvic aldehyde solutions.

We have invented a simple and economical process whereby formaldehyde can be essentially completely removed from aqueous pyruvic aldehyde solutions with substantially no loss of pyruvic aldehyde.

In accordance with our invention, a solution comprising pyruvic aldehyde, formaldehyde and water is admixed with an excess of methanol, i. e. from about 0.1 to about 2 volumes of methanol per volume of solution, and sufficient acid catalyst, such as $H_2SO_4$ or HCl, to bring the pH of the solution with the range of from about 1 to about 3. The resulting mixture is heated to a temperature of from about 65° C. to about 95° C., and preferably from about 70° C. to about 80° C., and atmospheric pressure, whereby dimethyl formal and dimethyl acetal of pyruvic aldehyde are formed. Under these conditions, an azeotrope of dimethyl formal and methanol are distilled off. When all of the azeotrope has been distilled from the mixture, which is indicated when the temperature of the vaporous reaction effluent reaches the boiling point of methanol (about 64.5–65° C.), water is added to the liquid reaction mixture. From about 0.2 to about 1 volume of water is added per volume of liquid mixture. The mixture is then heated at a kettle temperature of from about 80° C. to 100° C., and preferably from about 85° C. to 95° C. and atmospheric pressure in order to hydrolyze the dimethyl acetal of pyruvic aldehyde. The heating is continued to remove the methanol from the solution. Preferably, the heating is continued until the temperature of the vaporous effluent is from about 75° C. to about 85° C. and the pressure is then gradually reduced from atmospheric pressure to form about 200 to about 400 mm. Hg to remove methanol from the solution. The operation should preferably be continued until the boiling point of water is reached at the particular pressure employed, in order to insure the removal of the last traces of methanol. The remaining aqueous solution contains substantially all of the pyruvic aldehyde originally present and substantially no formaldehyde.

The following examples are illustrative:

*Example I*

A charge of 1000 grams of crude pyruvic aldehyde solution which contained 36.35 percent pyruvic aldehyde and 4.16 percent formaldehyde, 590 grams of methanol and 5 cc. of concentrated hydrochloric acid was placed in a distilling flask connected to a packed column one inch in diameter and 36 inches long. The mixture was refluxed, with an azeotrope of dimethyl formal and methanol being taken off overhead as it was formed. When no more formal appeared in the distillate, 500 cc. of water was added to the kettle. The distillation was continued with excess methanol being distilled off until the head temperature was 85° C. and the kettle temperature was 95° C. The pressure was then reduced on the system and the distillation was continued to remove the last traces of methanol. The final head temperature was 72° C. at 280 mm. Hg. The residue weighed 1266 grams. It contained 26.65 percent pyruvic aldehyde and was free from formaldehyde. The over-all efficiency was 92.9 percent based on the pyruvic aldehyde charged.

*Example II*

A charge of 772 grams of crude pyruvic aldehyde which contained 34.5 percent pyruvic aldehyde and 3.16 percent formaldehyde, 456 grams of methanol and 2 cc. of sulfuric acid was placed in the still described in Example I. The mixture was refluxed at a kettle temperature of 81° C. to 83° C. while the azeotrope of dimethyl formal and methanol was distilled off. When the head temperature reached the boiling point of methanol, 200 cc. of water was added. The distillation was continued at atmospheric pressure to a kettle temperature of 100° C. and head temperature of 98° C. The residue weighed 850 grams and contained 26.15 percent pyruvic aldehyde and was substantially free from formaldehyde. The efficiency of the operation was 83.6 percent.

*Example III*

A charge of 14,715 pounds of crude pyruvic aldehyde, which had an average composition of 43.25 percent pyruvic aldehyde and 3.7 percent formaldehyde, 3,000 gallons of methanol and 11 gallons of concentrated hydrochloric acid was placed in a 6,000 gallon stainless steel still. This vessel was connected to a bubble-cap column with 20 theoretical trays. The material was refluxed and dimethyl formal and methanol were distilled off until the head temperature reached 64° C. There was then added 1,050 gallons of water and the distillation was continued with methanol being taken off until the kettle temperature reached 90° C. The system was then placed under reduced pressure and methanol was distilled off at the rate of 200 to 300 gallons per hour. During this time the kettle temperature was held between 75° C. and 80° C. and the head temperature between 50° C. and 55° C. by gradually reducing the pressure as the amount of methanol diminished. The reaction was shut down when the kettle temperature was 77° C. and the head temperature 55° C. at 250 mm. Hg. Analysis of a sample of the kettle material at that point indicated that it contained no formaldehyde and that all of the dimethyl acetal of pyruvic aldehyde had been hydrolyzed. The kettle contents weighed 23,062 pounds and contained 22.4 percent pyruvic aldehyde. This was an over-all efficiency of 81.2 percent for the operation.

Unless otherwise specified, all percentages mentioned in this specification are by weight.

We claim:

1. A process for the removal of formaldehyde from a solution comprising pyruvic aldehyde, formaldehyde and water, which comprises admixing said solution with an acid catalyst and an excess of methanol and heating the resulting mixture at a temperature of from about 65° C. to about 95° C. and atmospheric pressure, whereby a first vaporous effluent is distilled from the mixture, continuing heating the mixture until the temperature of said first vaporous effluent is about 64.5° C., thereafter adding to the remaining solution from about 0.2 to about 1 volume of water, based on said solution, and heating the resulting mixture at a temperature of from about 80° C. to about 100° C. until substantially all methanol is distilled from the mixture.

2. A process for the removal of formaldehyde from a solution comprising pyruvic aldehyde, formaldehyde and water, which comprises admixing said solution with an acid catalyst and an excess of methanol and heating the resulting mixture at atmospheric pressure to form dimethyl formal and dimethyl acetal of pyruvic aldehyde, distilling off an azeotrope of dimethyl formal and methanol, adding water to the solution remaining after substantially all the azeotrope has been distilled off, heating the resulting liquid mixture at atmospheric pressure to hydrolyze the dimethyl acetal of pyruvic aldehyde and continuing the heating to distill off methanol from the mixture.

3. A process for the removal of formaldehyde from a solution comprising pyruvic aldehyde, formaldehyde and water, which comprises admixing said solution with an acid catalyst and an excess of methanol and heating the resulting mixture at atmospheric pressure to form dimethyl formal and dimethyl acetal of pyruvic aldehyde, distilling off an azeotrope of dimethyl formal and methanol, adding water to the solution remaining after substantially all the azeotrope has been distilled off, heating the resulting liquid mixture at atmospheric pressure to hydrolyze the dimethyl acetal of pyruvic aldehyde and continuing the heating while gradually reducing the pressure to distill off methanol from the mixture.

4. A process for the removal of formaldehyde from a solution comprising pyruvic aldehyde, formaldehyde and water, which comprises admixing said solution with an acid catalyst and an excess of methanol and heating the resulting mixture at a temperature of from about 65° C. to about 95° C. and atmospheric pressure to form dimethyl formal and dimethyl acetal of pyruvic aldehyde and to distill off an azeotrope of dimethyl formal and methanol, adding water to the solution remaining after substantially all the azeotrope has been distilled off, heating the resulting mixture at a temperature of from about 80° C. to about 100° C. and atmospheric pressure to hydrolyze the dimethyl acetal of pyruvic aldehyde and continuing the heating to distill off methanol from the mixture.

5. A process for the removal of formaldehyde from a solution comprising pyruvic aldehyde, formaldehyde and water, which comprises admixing said solution with an acid catalyst and an excess of methanol and heating the resulting mixture at a temperature of from about 65° C. to about 95° C. and atmospheric pressure to form dimethyl formal and dimethyl acetal of pyruvic aldehyde and to distill off an azeotrope of dimethyl formal and methanol, adding water to the solution remaining after substantially all the azeotrope has been distilled off, heating the resulting mixture at a temperature of from about 80° C. to about 100° C. and atmospheric pressure to hydrolyze the dimethyl acetal of pyruvic aldehyde and continuing the heating while gradually reducing the pressure to from 200 to 400 mm. Hg to distill off methanol from the mixture.

References Cited in the file of this patent

UNITED STATES PATENTS

| | | |
|---|---|---|
| 2,307,937 | Marvel | Jan. 12, 1943 |
| 2,684,985 | Steitz | July 27, 1954 |

OTHER REFERENCES

Cromeans: Abstract of appl'n. Ser. No. 43,202, published November 20, 1951. 652 O. G. 891.